(12) United States Patent
Shiraki et al.

(10) Patent No.: US 6,182,707 B1
(45) Date of Patent: Feb. 6, 2001

(54) HOLLOW TUBULAR BODY FOR AIR INTAKE DUCT, MOLD THEREFOR, AND METHOD OF MOLDING THE SAME

(75) Inventors: Hayato Shiraki, Ashikaga; Yoshiaki Sasatani, Uhisiku; Noriaki Matsumoto, Ashikaga, all of (JP)

(73) Assignee: Bando Chemical Industries, Ltd., Kobe (JP)

( * ) Notice: Under 35 U.S.C. 154(b), the term of this patent shall be extended for 0 days.

(21) Appl. No.: 09/284,075

(22) PCT Filed: Oct. 14, 1997

(86) PCT No.: PCT/JP97/03679

§ 371 Date: Oct. 12, 1999

§ 102(e) Date: Oct. 12, 1999

(87) PCT Pub. No.: WO98/16365

PCT Pub. Date: Apr. 23, 1998

(30) Foreign Application Priority Data

Oct. 14, 1996 (JP) .................................................. 8-271105

(51) Int. Cl.[7] ...................................................... F16L 9/00
(52) U.S. Cl. ........................ 138/177; 138/109; 264/239; 264/259; 425/542
(58) Field of Search ................................... 138/177, 137, 138/109; 264/262, 239, 259, 260; 425/556, 577, 542, 547

(56) References Cited

U.S. PATENT DOCUMENTS 5,495,873 * 3/1996 Butkiewicz et al. ............. 138/177 X
5,526,847 * 6/1996 Macovaz et al. ..................... 138/109
5,699,835 * 12/1997 Nakagawa et al. ............. 138/177 X
6,065,502 * 5/2000 Horton .................................. 138/177

FOREIGN PATENT DOCUMENTS

| | | |
|---|---|---|
| 0 440 020 | 8/1991 | (EP) . |
| 0 692 360 | 1/1996 | (EP) . |
| 2 173 146 | 10/1986 | (GB) . |
| 2 267 678 | 12/1993 | (GB) . |
| 04004123 | 1/1992 | (JP) . |
| 04168017 | 6/1992 | (JP) . |
| 05084786 | 4/1993 | (JP) . |
| 5-200805 | 8/1993 | (JP) . |
| 07144343 | 6/1995 | (JP) . |
| 9-076273 | 3/1997 | (JP) . |
| 9-254270 | 9/1997 | (JP) . |
| 10024457 | 1/1998 | (JP) . |

* cited by examiner

*Primary Examiner*—Patrick Brinson
(74) *Attorney, Agent, or Firm*—Marshall, O'Toole, Gerstein, Murray & Borun

(57) ABSTRACT

A polyamide resin containing reinforcing fiber is dry blended with a polyamide resin containing no or less reinforcing fiber. A polyamide resin containing 15 to 50% by weight of reinforcing fiber thus obtained is used as a material. By using a moving type core having a two-stage structure including a large diameter moving core and a small diameter moving core, a tubular hollow molded body 17 is formed, and redundant portions 18 and 19 are cut and removed.

8 Claims, 5 Drawing Sheets

HOLLOW TUBULAR BODY FOR AIR INTAKE DUCT, MOLD THEREFOR, AND METHOD OF MOLDING THE SAME

TECHNICAL FIELD

The present invention relates to a hollow tubular body for an air intake duct, and a mold and a molding method for the hollow tubular body, and more particularly to a hollow tubular body for an air intake duct which is suitable for a mechanical supercharger (hereinafter referred to as an "MSC" in this specification) that has been widely used for increasing the volumetric efficiency of internal and external combustion engines of an automobile or the like.

BACKGROUND ART

As resinous intake parts for internal and external combustion engines of an automobile or the like, various ducts have been manufactured by blow molding and an intake manifold has been manufactured by a fusibility core method or welding of a plurality of parts. However, they have not been resinified as an air intake duct for the MSC but have been manufactured by aluminum die casting using a sandmold.

If the sandmold is used, however, a product becomes very rough with a maximum surface roughness of $Rz \geqq 50\mu m$ and a mean surface roughness of $Ra \approx 8 \mu m$. For this reason, it is necessary to perform a grinding work in order to keep a profile irregularity of a supercharger junction. Furthermore, a difference in level is easily caused by mismatch. Therefore, it is also necessary to perform a finishing work for a hose junction.

The reasons why a resin has not been used for the air intake duct for the MSC are as follows.

(1) It is hard to integrally mold a flange portion by the blow molding.

(2) Few resin materials for the blow molding have performance, for example, strength, heat resistance and the like necessary for the air intake duct for the MSC. The resin materials having the performance such as strength, heat resistance and the like are expensive. Moreover, the surface roughness of an internal wall is deteriorated more than in existing items (manufactured by the aluminum die casting).

(3) In the fusibility core method or the welding method of a plurality of parts, the investment for a mold and initial plant should be made greatly. In consideration of plant repayment, a cost is increased more than in the existing items.

An injection molding method using a fused resin and a fluid such as an inert gas or the like together (a gas assist injection method which will be hereinafter referred to as "GAI") has recently been applied variously as a method for molding a hollow bent tube at a low cost.

The merits of the GAI are as follows: "(1) A mold can be manufactured by simply adding comparatively inexpensive equipment to an ordinary mold for injection molding; (2) Since a flange portion can be molded integrally and a mean surface roughness is small, a grinding work is not necessary; (3) It is possible to select inexpensive resin materials suitable for the present product from a great variety of injection molding resins; (4) It is possible to obtain appearance and dimensional precision equivalent to or more than those of an ordinary injection molded product; (5) A low pressure molding method is used so that the life of the mold can be prolonged; and the like."

However, the mere GAI has disadvantages, for example, "(1) If a reinforcement (glass fiber or the like) is blended to such an extent that necessary performance is revealed, an internal wall becomes rough in the same manner as in the blow molding; (2) It is hard to obtain the same hollow rate as in existing items (manufactured by the aluminum die casting); and the like."

In consideration of these problems of the prior art, it is an object of the present invention to provide a hollow tubular body for an air intake duct which can be manufactured at a low cost and has an excellent internal smoothness. It is another object of the present invention to provide a mold capable of stably molding a hollow tubular body for an air intake duct having various sizes and shapes, and a method for molding the hollow tubular body.

DISCLOSURE OF THE INVENTION

In order to attain the above-mentioned object of the present invention, a polyamide resin is selected as a thermoplastic resin. A polyamide resin blended with a proper quantity of reinforcing fiber and a polyamide resin blended with less or no reinforcing fiber are employed as a material. Furthermore, a mold for molding the resin material includes a cavity mold and a core mold. A moving type core having a two-stage structure including a large diameter moving core and a small diameter moving core is provided in the core mold. Thus, the above-mentioned object can be achieved.

The present invention provides a resinous hollow tubular body for an air intake duct which is molded by gas assist injection and integrally communicates from a flange to be coupled to a supercharger to a hose junction by means of a bent tube portion and a straight tube portion, wherein a resin material is a polyamide resin containing 15 to 50 % by weight of reinforcing fiber.

It is preferable that a polyamide resin reinforced with fiber or the like should be used because a balance of heat resistance, impact resistance and strength (tension, bending and compression) and a cost is kept. There are various kinds of polyamide resins in which 46 nylon, 11 nylon and 12 nylon are expensive. Since the 46 nylon has a small temperature range for fusing and a time for obtaining a specific volume suitable for GAI is short, it is hard to perform molding. Since the 11 nylon and the 12 nylon have high fusing viscosities, a poor fluidity is obtained when suitable specific volumes are reached. Similarly, it is hard to perform molding. In this respect, polymetaxyleneadipamide, 66 nylon and 6 nylon do not have such drawbacks. In particular, the polymetaxyleneadipamide is an excellent resin material for the GAI.

Examples of the reinforcing fiber include glass fiber, carbon fiber, aramid fiber, a whisker-shaped reinforcement and the like. It is preferable that the glass fiber should be used because a low cost is required and great reinforcing effects are obtained.

If the quantity of the reinforcing fiber to be added is less than 15% by weight, reinforcing effects cannot be obtained. If the quantity of the reinforcing fiber to be added is more than 50% by weight, a cost is increased and moldability is deteriorated. The resin material is obtained by dry blending (A) a polyamide resin containing reinforcing fiber and (B) a polyamide resin containing no reinforcing fiber or containing less reinforcing fiber than in (A). If the resin material is used for fusing and mixing by the GAI, an island of the resin containing no (or less) reinforcing fiber is ununiformly floated in a sea of the resin containing the reinforcing fiber. If a pressurized fluid is injected, the resin is expanded to envelop the reinforcing fiber. Consequently, the internal smoothness of a molded hollow tubular body is enhanced.

A bellows-shaped concavo-convex portion is provided on an outside of the bent tube portion that a pressurized fluid sent from the supercharger directly strikes, thereby partially changing a thickness. Consequently, it is possible to reduce resonance sounds made by causing the fluid sent from the supercharger to strike an internal wall of the hollow tubular body.

Furthermore, if the hose junction is formed of a straight tube having a length of 30 mm or more, joining with a hose can conveniently be performed.

The present invention provides a mold for molding a resinous hollow tubular body for an air intake duct which is molded by gas assist injection and integrally communicates from a flange to be coupled to a supercharger to a hose junction by means of a bent tube portion and a straight tube portion, wherein a bent tubular cavity and a straight tubular cavity are formed in a cavity mold, a large diameter moving core which has the same shape and dimension as an opening of the flange to be formed by the bent tubular cavity and serves to move in a direction orthogonal to a flange face is provided in a core mold directly connected with the cavity mold, and a small diameter moving core to move in the same direction as the large diameter moving core is provided in the large diameter moving core and serves to move after movement of the large diameter moving core is completed.

Furthermore, the present invention provides a method for molding a hollow tubular body for an air intake duct by a mold which directly connects a cavity mold forming a bent tubular cavity and a straight tubular cavity with a core mold having a large diameter moving core and a small diameter moving core, the method comprising the steps of injecting a fused resin into the cavity mold, injecting a pressurized gas into the cavity to introduce the fused resin into the core mold, moving the large diameter moving core having the same shape and dimension as an opening of a flange to be formed by the bent tubular cavity in a direction orthogonal to a flange face, moving the small diameter moving core provided in the large diameter moving core in the same direction as the large diameter moving core after movement of the large diameter moving core is completed, performing cooling, and removing a redundant portion formed by a resin injection portion and the moving core from the hollow tubular body obtained after getting out of the mold.

According to the mold having the above-mentioned structure and the molding method, if the pressurized gas is injected into the fused resin material introduced into the cavity mold, the resin material is reduced in a thickness while being pushed toward the internal surface of the mold by the pressure of the pressurized gas. In some cases, a thick portion is formed on the tip of the resin flowing in the cavity. However, the moving type core is provided on the tip of the flowing resin where the thick portion is easily formed. The moving type core has a two-stage structure including the large diameter moving core having a large sectional area and the small diameter moving core having a small sectional area. Therefore, in a case where the thick portion is formed even if the large diameter moving core is moved to a terminal position, the small diameter moving core in the large diameter moving core is moved to the terminal position so that a new cavity is formed. By drawing the thick portion into the cavity, it is possible to obtain a hollow tubular body having an almost uniform thickness as a whole.

In a case where an end face provided on the hose junction side of the hollow tubular body is set as a starting point and an end face provided on the flange side is set as an end point, end faces of the large diameter moving core and the small diameter moving core on the flange side are gradually inclined inwardly apart from the flange by setting a contact point with the flange as an origin in such a manner that a distance between the starting point and the end point is almost constant. Consequently, a local difference in a thickness is not made on the hollow tubular body. Therefore, the hollow tubular body is broken with difficulty during the molding.

The present invention having the above-mentioned structure can provide a hollow tubular body for an air intake duct having an excellent internal smoothness and a uniform thickness at a low cost. According to the mold and the molding method of the present invention, a hollow tubular body for an air intake duct having various sizes and shapes can be stably molded without breaking a resin wall.

BEST MODE FOR CARRYING OUT THE INVENTION

An embodiment of the present invention will be described below. A resin material to be used was obtained by dry blending, at a weight ratio of 1:1, "Reny6002 (containing no glass fiber)" and "Reny1032 (containing 60% by weight of glass fiber)" manufactured by Mitsubishi Engineering Plastic Co., Ltd. The dry blended resin was injected into a mold shown in FIGS. 1 and 2 using a GAI unit manufactured by Nireko Co., Ltd., thereby molding a hollow tubular body.

Figure 1:
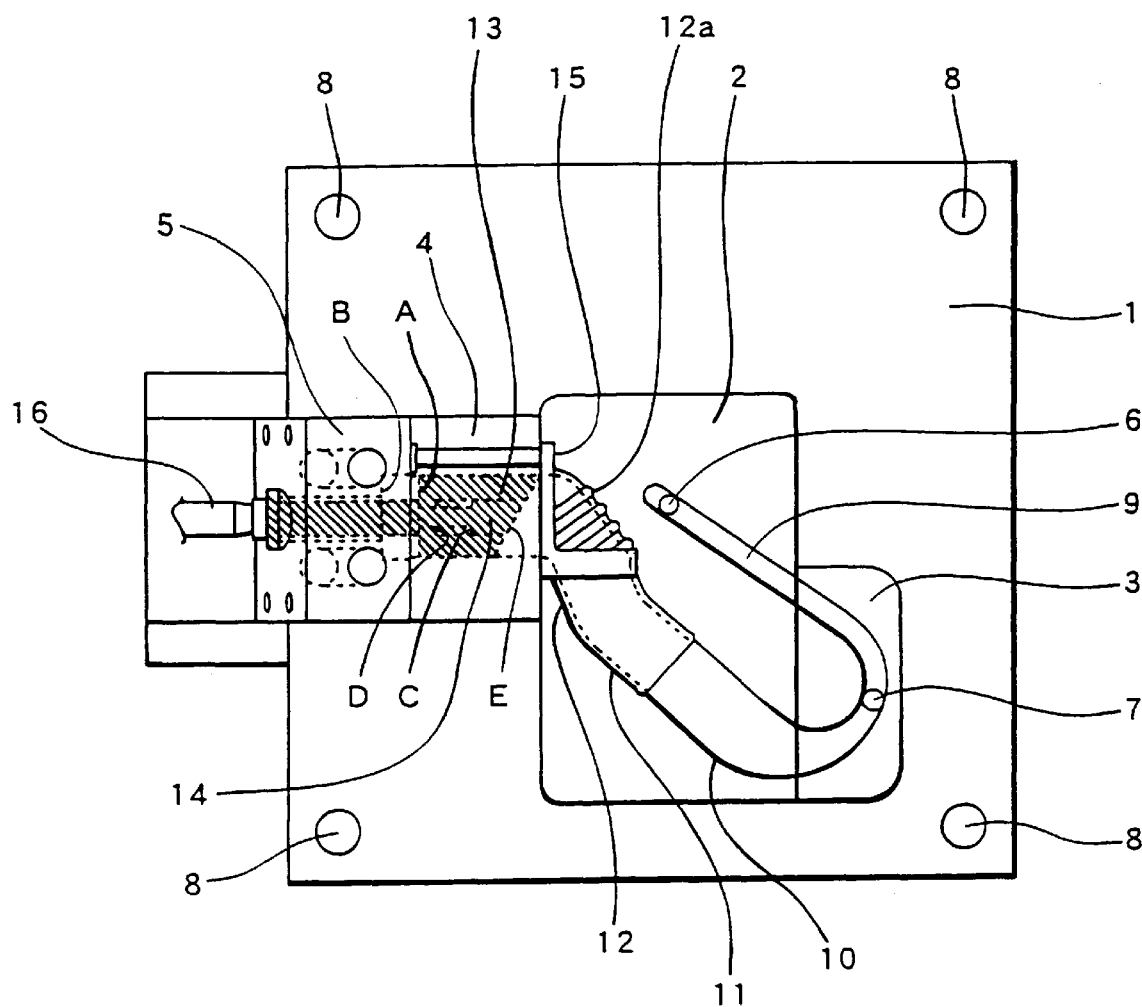
FIG. 1 is a plan view showing a mold according to the present invention.
Figure 2:
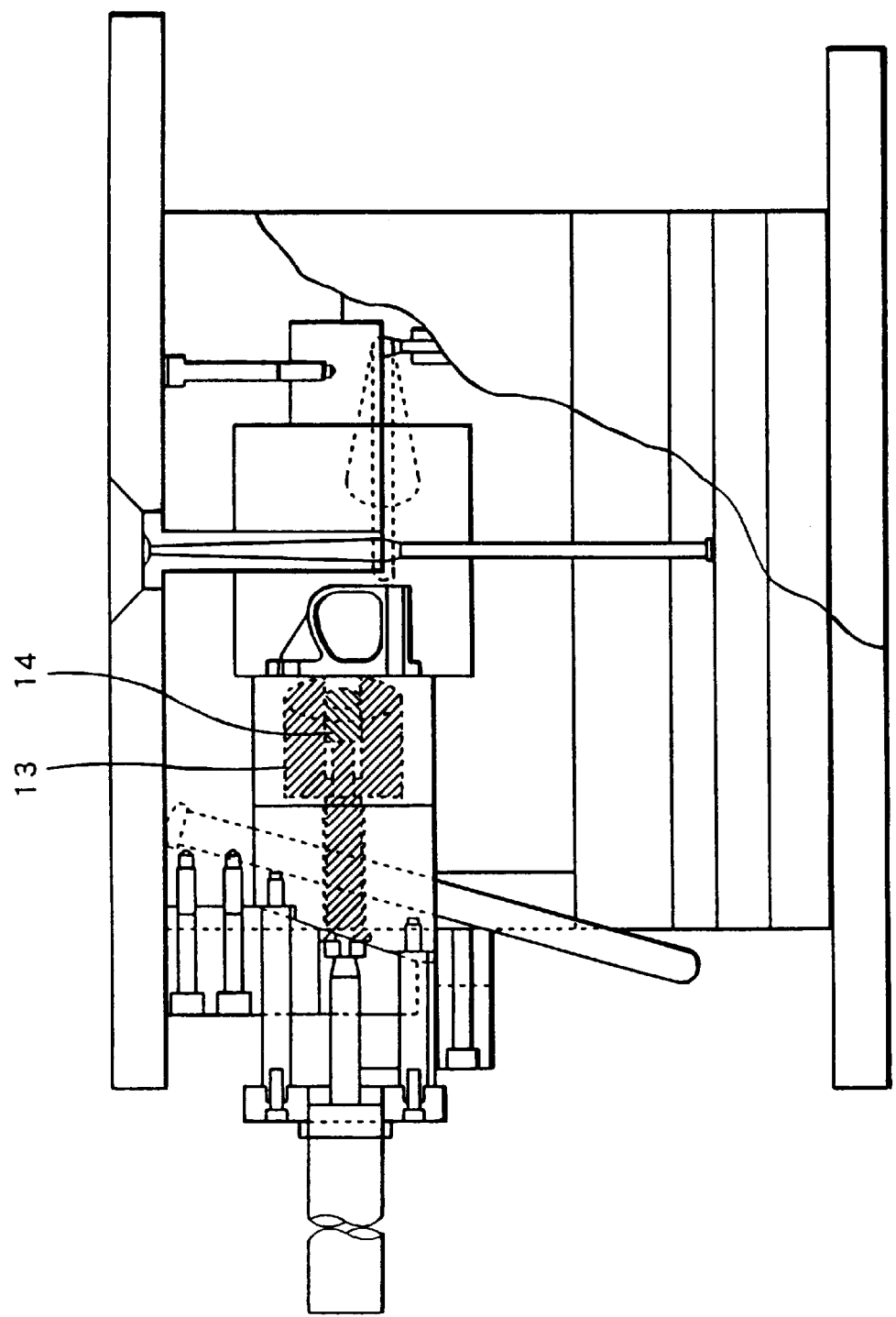
FIG. 2 is an elevational view showing the mold according to the present invention.

With reference to FIGS. 1 and 2, the reference numeral 1 denotes a molding plate, the reference numerals 2, 3, 4 and 5 denote inserts 1, 2, 3 and 4, respectively, the reference numeral 6 denotes a resin inlet, the reference numeral 7 denotes a pressurized gas inlet, the reference numeral 8 denotes a guide pin, the reference numeral 9 denotes a bar-shaped runner, the reference numeral 10 denotes a horn-shaped runner, the reference numeral 11 denotes a straight tubular cavity, and the reference numeral 12 denotes a bent tubular cavity. A bellows-shaped concavo-convex portion 12a is formed on an outside of the bent tubular cavity 12. The reference numeral 13 denotes a large diameter moving core, and the reference numeral 14 denotes a small diameter moving core. End faces E of the large diameter moving core 13 and the small diameter moving core 14 on a flange side are gradually inclined inwardly apart from a flange 15 by setting a contact point with the flange 15 as an origin. The large diameter moving core 13 is movable between points A and B, and the small diameter moving core 14 is movable between points C and D. The reference numeral 16 denotes a rod of a hydraulic cylinder for the movement of the moving core.

The fused resin material was injected into the resin inlet 6 of the mold having the above-mentioned structure, and a pressurized gas was then injected through the pressurized gas inlet 7. Consequently, the resin material formed a hollow portion while being expanded by the pressure of the pressurized gas. When the flowing tip of the resin reached the moving core, the large diameter moving core 13 moved left together with the small diameter moving core 14 and pushed the resin against an external wall where the large diameter moving core 13 had moved. Finally, a terminal position B was reached. Thus, a hollow tubular body having an almost uniform thickness could be molded (first to sixth embodiments in the following Table 1).

As another embodiment, the above-mentioned steps were performed from the injection of the fused resin material till the movement of the large diameter moving core 13 to the terminal position B. Then, the pressurized gas was further injected through the pressurized gas inlet 7. Consequently, the small diameter moving core 14 moved left in the large diameter moving core 13 stopped at the terminal position B. In particular, the resin in the flowing tip which easily forms a thick portion was drawn into the movement trace of the small diameter moving core 14 to reach a terminal position D. Thus, a tubular hollow molded body 17 having an almost uniform thickness shown in FIG. 3 could be obtained (seventh to twelfth embodiments in the following Table 1).

For comparison, the mold including a moving core having a horizontal end face was used. Similarly, a tubular hollow molded body was obtained (comparative examples 1 to 6 in the following Table 1).

Figure 3:
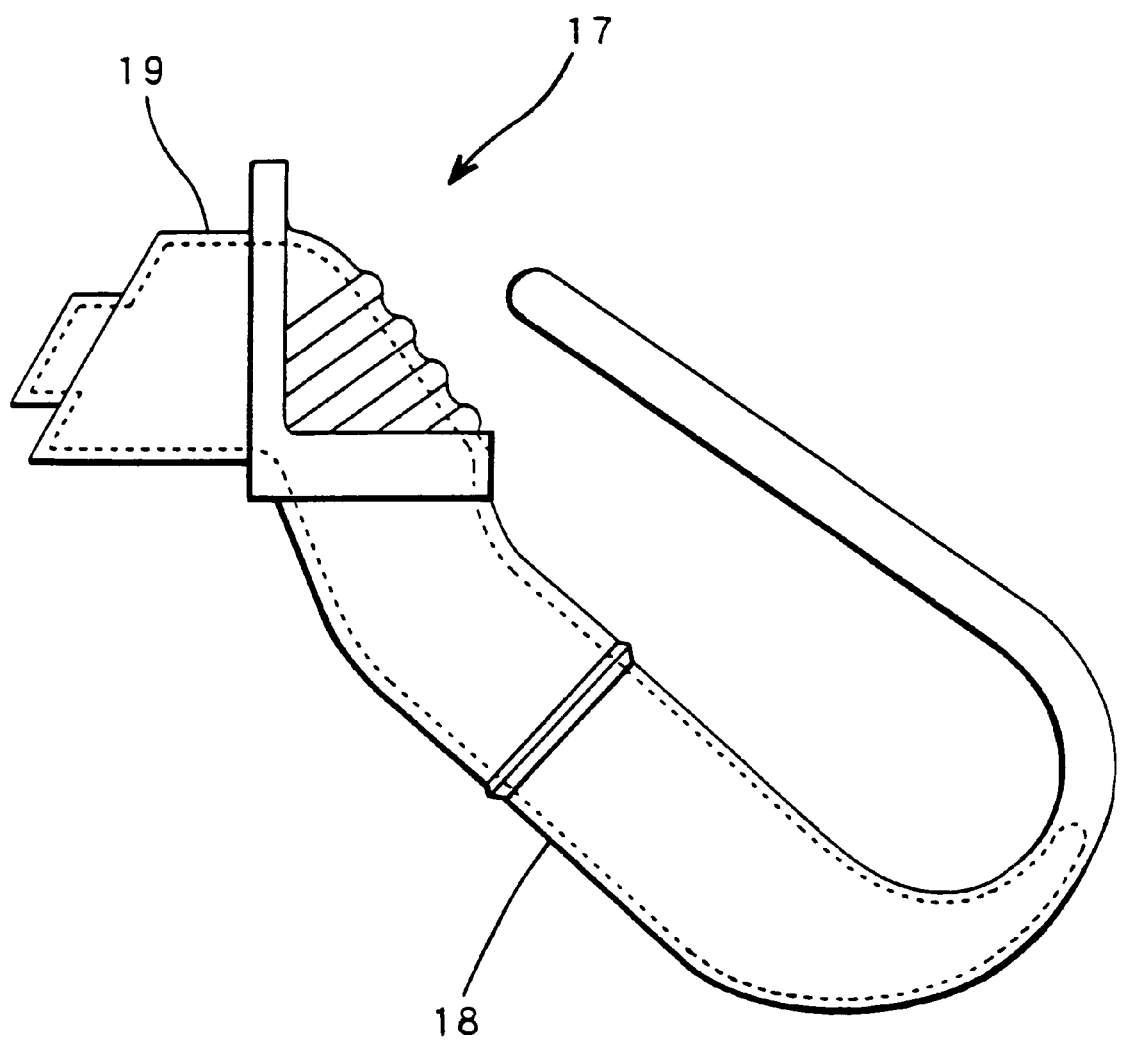
FIG. 3 is a side view showing a tubular hollow molded body formed by a mold according to an embodiment of the present invention.
Figure 4A:
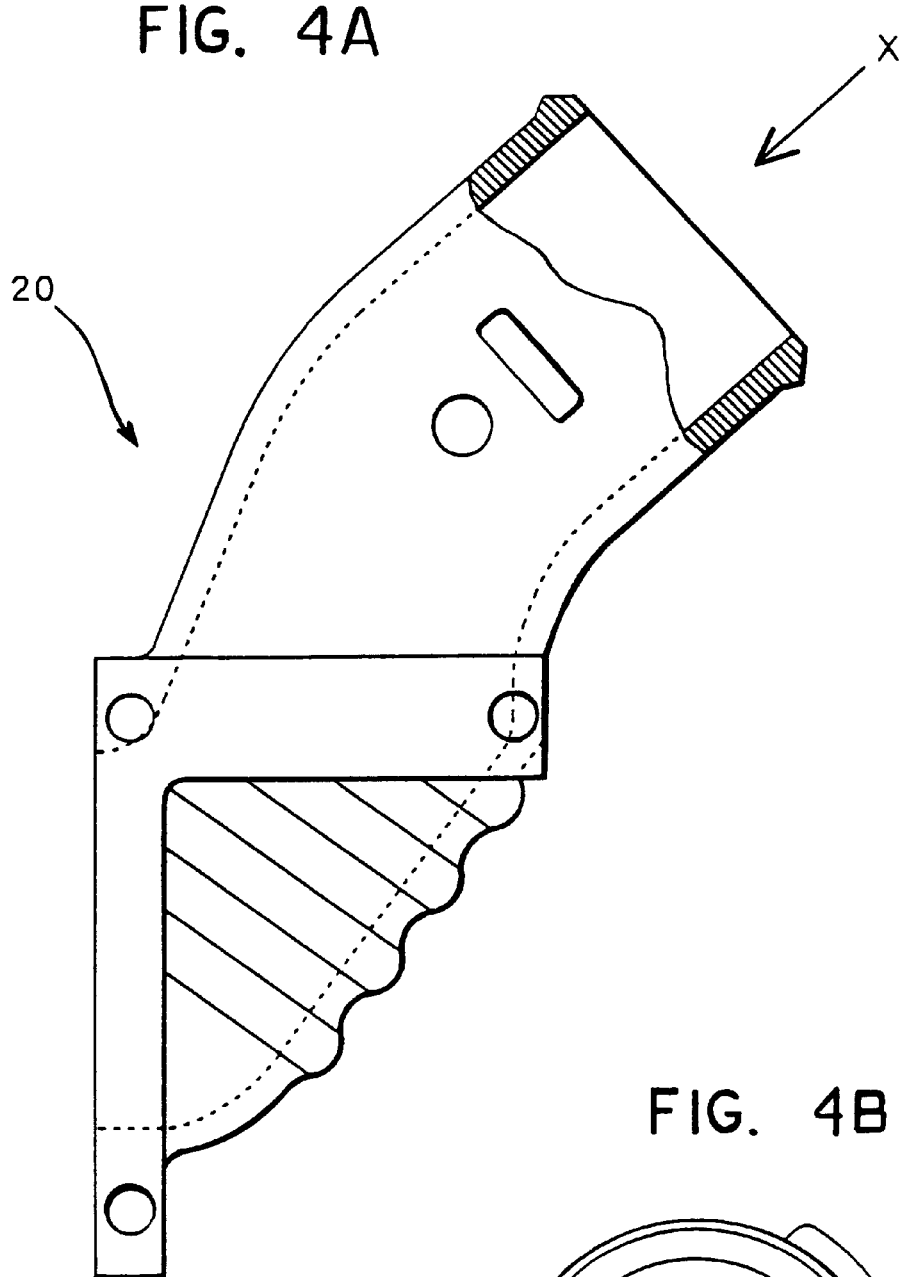
FIG. 4A is a side view showing an air intake duct obtained by a method according to an embodiment of the present invention.
Figure 4B:
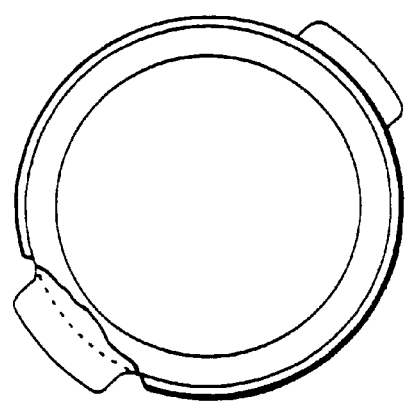
FIG. 4B is a view seen in an X direction in FIG. 4A.
Figure 5:
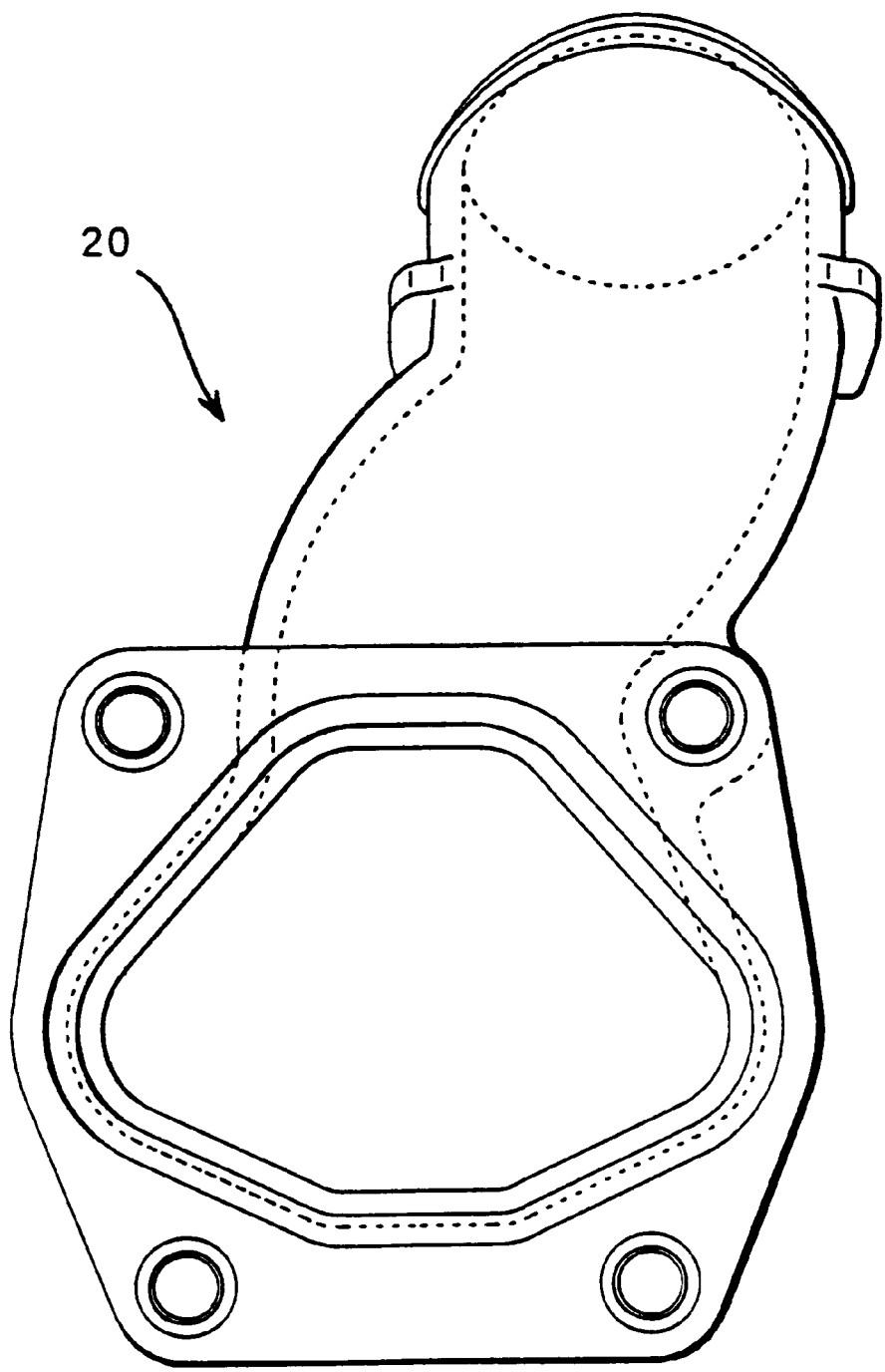
FIG. 5 is a front view showing the air intake duct obtained by the method according to the embodiment of the present invention.

Redundant portions 18 and 19 were cut and removed from the tubular hollow molded body 17 shown in FIG. 3. Consequently, a hollow tubular body 20 for an air intake duct shown in FIGS. 4 and 5 was obtained.

The results of a molding test for the above-mentioned tubular hollow molded body will be listed in the following Table 1.

The following respects are obvious from the Table 1.
(1) The resin wall was not broken over the hollow tubular body according to the first to twelfth embodiments.
(2) The resin wall of the moving core portion was broken over the hollow tubular body according to the comparative examples 1 to 6. After cutting this portion, therefore, an opening shape became distorted. Consequently, working man-day was increased before a product was offered.
(3) In the first to third embodiments, the seventh to ninth embodiments and the comparative examples 1 to 3, a time for injecting the resin is short, i.e., 2 seconds. A hollow portion is formed with a low viscosity of the fused resin when the injection is completed. Therefore, a deflection in thickness is increased by a counterflow of the resin sent from the moving core. However, the counterflow of the resin could be prevented by cooling the moving core down to 60° C. or less at a cold blast.
(4) In the first to third embodiments, the seventh to ninth embodiments and the comparative examples 1 to 3, the time for injecting the resin is short, i.e., 2 seconds, and the viscosity of the fused resin is low when the injection is completed. Therefore, the obtained molded product has a small surface roughness.

In the fourth to sixth embodiments, the tenth to twelfth embodiments and the comparative examples 4 to 6, however, the time for injecting the resin is long, i.e., 6 seconds, and the viscosity of the fused resin is high when the injection is completed. Therefore, the obtained molded product has a slightly great surface roughness.

INDUSTRIAL AVAILABILITY

Since the present invention has the above-mentioned structure, it is suitable for a device for stably molding a hollow tubular body for an air intake duct having various sizes and shapes which has an excellent internal smoothness at a low cost.

What is claimed is:

1. A resinous hollow tubular body for an air intake duct which is molded by gas assist injection and integrally communicates from a flange to be coupled to a supercharger to a hose junction by means of a bent tube portion and a

TABLE 1

| | | Resin injection time | Gas injection delay time | Gas injection time | Type of moving core | Area of top panel of moving core | Capacity of moving core | Support pressure of moving core | Breakage of resin wall of moving core | Ra μm | Rz μm |
|---|---|---|---|---|---|---|---|---|---|---|---|
| Embodiment | 1 | 2 seconds | 1 second | 4 seconds | Inclination type | 24.5 cm² | 85.5 cm³ | 118 kg/cm² | Not broken | 2.5 | 24 |
| | 2 | ↑ | ↑ | ↑ | ↑ | ↑ | ↑ | 59 kg/cm² | ↑ | ↑ | ↑ |
| | 3 | ↑ | ↑ | ↑ | ↑ | ↑ | ↑ | 20 kg/cm² | ↑ | ↑ | ↑ |
| | 4 | 6 seconds | 2 seconds | ↑ | ↑ | ↑ | ↑ | 118 kg/cm² | ↑ | 5.0 | 35 |
| | 5 | ↑ | ↑ | ↑ | ↑ | ↑ | ↑ | 59 kg/cm² | ↑ | ↑ | ↑ |
| | 6 | ↑ | ↑ | ↑ | ↑ | ↑ | ↑ | 20 kg/cm² | ↑ | ↑ | ↑ |
| | 7 | 2 seconds | 1 second | ↑ | ↑ | ↑ | 93.5 cm³ | 118 kg/cm² | ↑ | 2.5 | 20 |
| | 8 | ↑ | ↑ | ↑ | ↑ | ↑ | ↑ | 59 kg/cm² | ↑ | ↑ | ↑ |
| | 9 | ↑ | ↑ | ↑ | ↑ | ↑ | ↑ | 20 kg/cm² | ↑ | ↑ | ↑ |
| | 10 | 6 seconds | 2 seconds | ↑ | ↑ | ↑ | ↑ | 118 kg/cm² | ↑ | 5.0 | 35 |
| | 11 | ↑ | ↑ | ↑ | ↑ | ↑ | ↑ | 59 kg/cm² | ↑ | ↑ | ↑ |
| | 12 | ↑ | ↑ | ↑ | ↑ | ↑ | ↑ | 20 kg/cm² | ↑ | ↑ | ↑ |
| Comparative example | 1 | 2 seconds | 1 second | ↑ | Horizontal type | 20.5 cm² | 92.0 cm³ | 118 kg/cm² | Broken | 3.0 | 24 |
| | 2 | ↑ | ↑ | ↑ | ↑ | ↑ | ↑ | 59 kg/cm² | ↑ | ↑ | ↑ |
| | 3 | ↑ | ↑ | ↑ | ↑ | ↑ | ↑ | 20 kg/cm² | ↑ | ↑ | ↑ |
| | 4 | 6 seconds | 2 seconds | ↑ | ↑ | ↑ | ↑ | 118 kg/cm² | ↑ | 5.2 | 40 |
| | 5 | ↑ | ↑ | ↑ | ↑ | ↑ | ↑ | 59 kg/cm² | ↑ | ↑ | ↑ |
| | 6 | ↑ | ↑ | ↑ | ↑ | ↑ | ↑ | 20 kg/cm² | ↑ | ↑ | ↑ | straight tube portion, wherein a resin material is a polyamide resin containing 15 to 50% by weight of reinforcing fiber.

2. The hollow tubular body for an air intake duct according to claim 1, wherein the polyamide resin is polymethaxyleneadipamide, and the reinforcing fiber is glass fiber.

3. The hollow tubular body for an air intake duct according to claim 1, wherein the resin material is obtained by dry blending a polyamide resin containing reinforcing fiber and a polyamide resin containing no or less reinforcing fiber.

4. The hollow tubular body for an air intake duct according to claim 1, 2 or 3, wherein a bellows-shaped concavo-convex portion is provided on an outside of the bent tube portion that a pressurized fluid sent from the supercharger directly strikes.

5. The hollow tubular body for an air intake duct according to claim 1, 2 or 3, wherein the hose junction is formed of a straight tube having a length of 30 mm or more.

6. A mold for molding a resinous hollow tubular body for an air intake duct which is molded by gas assist injection and integrally communicates from a flange to be coupled to a supercharger to a hose junction by means of a bent tube portion and a straight tube portion, wherein a bent tubular cavity and a straight tubular cavity are formed in a cavity mold, a large diameter moving core which has the same shape and dimension as an opening of the flange to be formed by the bent tubular cavity and serves to move in a direction orthogonal to a flange face is provided in a core mold directly connected with the cavity mold, and a small diameter moving core to move in the same direction as the large diameter moving core is provided in the large diameter moving core and serves to move after movement of the large diameter moving core is completed.

7. The mold for molding a hollow tubular body for an air intake duct according to claim 6, wherein in a case where an end face provided on a hose junction side of the hollow tubular body is set as a starting point and an end face provided on a flange side is set as an end point, end faces of the large diameter moving core and the small diameter moving core on the flange side are gradually inclined inwardly apart from the flange by setting a contact point with the flange as an origin in such a manner that a distance between any circumferential point of the end face provided on the hose junction side and the end point is almost constant.

8. A method for molding a hollow tubular body for an air intake duct by a mold which directly connects a cavity mold forming a bent tubular cavity and a straight tubular cavity with a core mold having a large diameter moving core and a small diameter moving core, the method comprising the steps of:

injecting a fused resin into the cavity mold;

injecting a pressurized gas into the cavity to introduce the fused resin into the core mold;

moving the large diameter moving core having the same shape and dimension as an opening of a flange to be formed by the bent tubular cavity in a direction orthogonal to a flange face;

moving the small diameter moving core provided in the large diameter moving core in the same direction as the large diameter moving core after movement of the large diameter moving core is completed;

performing cooling; and removing a redundant portion formed by a resin injection portion and the moving core from the hollow tubular body obtained after getting out of the mold.

\* \* \* \* \*